Patented July 17, 1928.

1,677,235

UNITED STATES PATENT OFFICE.

RALPH V. HEUSER, OF ELIZABETH, NEW JERSEY, ASSIGNOR TO ALBERT C. BURRAGE, OF MANCHESTER, MASSACHUSETTS.

PROCESS FOR THE VULCANIZATION OF RUBBER AND PRODUCT THEREOF.

No Drawing.  Application filed June 5, 1925. Serial No. 35,252.

This invention relates to the vulcanization of rubber and more particularly to a process wherein the vulcanizing reaction is accelerated by conducting the same in the presence of a tri-substituted guanidine compound, containing an aryl radical having a substituent in the para position.

A process for preparing guanidine compounds, suitable for use in the present invention consists generically in a preliminary procedure comprising the reacton of carbon bi-sulfide and an aromatic amine (or two unlike aromatic amines such as ortho toluidine and para toluidine) by concurrent condensation of the amino groups therewith and the formation of the corresponding thiourea (e. g., ortho tolyl para tolyl thiourea) and substituting or replacing the sulfur of the thiourea nucleus by an aromatic imino group such as para toluidine—or other equivalent procedure by which a similar result is obtained,—whereby a guanidine nucleus is produced having the amino and imino groups associated with unlike aryl radicals, one or more of such groups or radicals being characterized by containing a secondary substituent, such as the methyl radical, in its para position.

In the instant case, for example, ortho tolyl di-para tolyl guanidine is produced, which may be represented by the symbol

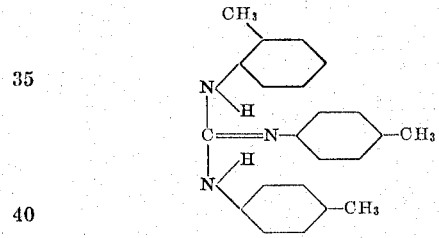

The thus prepared guanidine,—particularly characterized by containing within the constitution unlike aryl radicals comprising one or more para-substituted aryl groups,—is possessed of the ability to accelerate the vulcanization of rubber as effected by the usual vulcanizing procedure. Such guanidine compounds will of course be selected in any given case and for any given purpose with respect to the results desired and the conditions imposed by the mode of vulcanization which it is desired or necessary to employ.

Accordingly, in a given instance, which is representative of the invention, the appropriate para-substituted aryl guanidine, such as ortho tolyl di-para tolyl guanidine for example, is combined with the rubber and the vulcanizing agent such as sulfur, usually in small amount, typically of the order of 1% of the rubber by weight. The rubber is then subjected to heat in accordance with the practice usually followed, the temperature being suitably controlled and limited, as may be necessary. The vulcanization reaction is thereby facilitated and accelerated, and the resulting product is of good quality,—the specific properties depending upon the degree of vulcanization effected.

I claim:

1. A process for the vulcanization of rubber which comprises heating rubber with a vulcanizing agent and a substituted guanidine containing an aryl group in each of the amino positions and a para-substituted aryl group in the imino position.

2. A process for the vulcanization of rubber comprising heating rubber with a vulcanizing agent and a substituted guanidine containing unlike aryl groups in the amino positions and a para-substituted aryl group in the imino position.

3. A process for the vulcanization of rubber comprising heating rubber with a vulcanizing agent and a substituted guanidine containing unlike aryl groups in the amino positions, one of said groups being a para-substituted aryl group, and an aryl group in the imino position.

4. A process for the vulcanization of rubber comprising heating rubber with a vulcanizing agent and a substituted guanidine containing unlike aryl groups in the amino positions, of which one is a para-substituted aryl group, and a para-substituted aryl group in the imino position.

5. A process for the vulcanization of rubber which comprises heating rubber with a vulcanizing agent and ortho tolyl di-para tolyl guanidine.

6. A vulcanizing compound comprising rubber, a vulcanizing agent, and a substituted guanidine containing an aryl group in each of the amino positions and a para aryl group in the imino position.

7. A vulcanizing compound comprising rubber, a vulcanizing agent, and a substituted guanidine containing unlike aryl groups in the amino positions and a para aryl group in the imino position.

8. A vulcanizing compound comprising rubber, a vulcanizing agent, and a substituted guanidine containing unlike aryl groups in the amino positions one of said groups being a para-substituted aryl group and an aryl group in the imino position.

9. A vulcanizing compound comprising rubber, a vulcanizing agent and a substituted guanidine containing unlike aryl groups in the amino positions of which one is a para-aryl substituted aryl group and a para-substituted aryl group in the imino position.

10. A vulcanizing compound comprising rubber, a vulcanizing agent, and ortho tolyl di-para tolyl guanidine.

Signed by me at New York city this 3rd day of June 1925.

RALPH V. HEUSER.